(12) United States Patent
Liu et al.

(10) Patent No.: US 11,713,980 B2
(45) Date of Patent: Aug. 1, 2023

(54) METHOD AND APPARATUS FOR GENERATING MAP

(71) Applicants: Beijing Jingdong Shangke Information Technology Co., Ltd., Beijing (CN); Beijing Jingdong Century Trading Co., Ltd., Beijing (CN)

(72) Inventors: Yi Liu, Beijing (CN); Yuqian Li, Beijing (CN); Zheng Li, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 297 days.

(21) Appl. No.: 17/044,111

(22) PCT Filed: May 15, 2019

(86) PCT No.: PCT/CN2019/087034
§ 371 (c)(1),
(2) Date: Sep. 30, 2020

(87) PCT Pub. No.: WO2019/237879
PCT Pub. Date: Dec. 19, 2019

(65) Prior Publication Data
US 2021/0140792 A1      May 13, 2021

(30) Foreign Application Priority Data
Jun. 14, 2018   (CN) .......................... 201810611778.4

(51) Int. Cl.
*G01C 21/00*        (2006.01)

(52) U.S. Cl.
CPC ...... *G01C 21/3859* (2020.08); *G01C 21/3811* (2020.08); *G01C 21/3874* (2020.08)

(58) Field of Classification Search
CPC ........... G08G 1/096775; G08G 1/0112; G08G 1/0116; G08G 1/0141; H04W 4/44;
(Continued)

(56) References Cited

U.S. PATENT DOCUMENTS

2010/0223006 A1*   9/2010  Sasaki ................... G01C 21/26
701/533

FOREIGN PATENT DOCUMENTS

CN          101162149 A     4/2008
CN          106128290 A     11/2016
(Continued)

OTHER PUBLICATIONS

International Search Report and Written Opinion dated Aug. 10, 2019 for Application No. PCT/CN2019/087034, 4 pages.

*Primary Examiner* — Aaron L Troost
(74) *Attorney, Agent, or Firm* — Dinsmore & Shohl LLP

(57) ABSTRACT

A method for generating a map. The method comprises: acquiring current position information (302) of a target device (301) and a pre-generated electronic map (304), wherein the central position of the electronic map (304) is the position represented by position information of the target device (301) and acquired when or before the electronic map (304) is generated; and in response to the determination that a current position (302) represented by the current position information (302) meets pre-set adjustment conditions, using a new thread to execute the following adjustment steps to generate an adjusted electronic map (306): generating a new electronic map (305) with the current position (302) as the central position and adjusting the pre-generated electronic map (304) according to the new electronic map (305).

13 Claims, 5 Drawing Sheets

(58) Field of Classification Search
CPC ..... H04W 4/022; H04W 4/025; H04W 4/029; H04W 4/90; H04W 4/026; H04W 4/027; A63K 1/00; A63K 3/00; G01C 21/3859; G01C 21/3811; G01C 21/3874; G01C 21/3804

See application file for complete search history.

(56) References Cited

FOREIGN PATENT DOCUMENTS

| | | |
|---|---|---|
| CN | 106774347 A | 5/2017 |
| CN | 106855415 A | 6/2017 |
| CN | 107305125 A | 10/2017 |
| CN | 107544507 A | 1/2018 |
| CN | 107764270 A | 3/2018 |
| CN | 108090990 A | 5/2018 |
| JP | 2015175688 A | 10/2015 |
| JP | 2015175688 A | 11/2016 |

* cited by examiner

METHOD AND APPARATUS FOR GENERATING MAP

This patent application is a national stage of International Application No. PCT/CN2019/087034, filed on May 15, 2019, which claims priority to Chinese Patent Application No. 201810611778.4, filed Jun. 14, 2018, titled "METHOD AND APPARATUS FOR GENERATING MAPPING", the Applicant of which are Beijing Jingdong Shangke Information Technology Co., Ltd., and Beijing Jingdong Century Trade Co., Ltd. Both of the aforementioned applications are hereby incorporated by reference in their entireties.

TECHNICAL FIELD

Embodiments of the present disclosure relate to the field of computer technology, and more particularly, to a method and apparatus for generating a map.

BACKGROUND

An electronic map (Electronic map) is a map that is digitally stored and consulted using a computer technology. There are many types of electronic maps, such as topographic maps, remote sensing image maps, elevation model maps, various thematic maps, cost map, and the like. Among them, cost maps are widely used in various mobile robots to realize path planning of the mobile robot.

SUMMARY

The embodiment of the disclosure provides a method and an apparatus for generating a map.

According to a first aspect, an embodiment of the present disclosure provides a method for generating a map, the method including: acquiring current position information of a target device and a pre-generated electronic map, wherein a center position of the electronic map is a position indicated by the position information of the target device acquired when the electronic map is generated or before the electronic map is generated; and in response to determining that the current position indicated by the current position information meets a preset adjustment condition, using a new thread is to perform the following adjustment step to generate an electronic map with complete adjustment: generating a new electronic map using the current position as the center position, and adjusting the pre-generated electronic map based on the new electronic map.

In some embodiments, the pre-generated electronic map includes a mark of a position of a first expansion area, the first expansion area being obtained by expanding a portion of a first obstacle located outside a first non-passable area, the first obstacle being an obstacle in an area of a predetermined size where the target device is located, and the first non-passable area being a non-passable area in the area of the predetermined size.

In some embodiments, the pre-generated electronic map is obtained using the following generation step: acquiring the position information of the target device; determining a position of a first obstacle and a first non-passable area within an area of a predetermined size where the position indicated by the position information is located; expanding a portion of the first obstacle located outside the first non-passable area to obtain a first expansion area; and generating an electronic map using the position indicated by the position information as the center position and including a mark of the position of the first obstacle, a mark of a position of the first expansion area, and a mark of a position of the first non-passable area.

In some embodiments, the first obstacle includes a first type obstacle and a second type obstacle, position information of the first type obstacle is obtained from a target electronic device, and position information of the second type obstacle is obtained from the target device; and the generating step further includes: storing position information of a position of an expansion area corresponding to a portion of the first type obstacle outside the first non-passable area.

In some embodiments, the generating a new electronic map using the current position as the center position, including: determining a position of a second obstacle in the new electronic map to be generated and a position of a second non-passable area; expanding a portion of the second obstacle outside the second non-passable area to obtain a second expansion area; and generating the new electronic map using the current position as the center position and including a mark of the position of the second non-passable area, a mark of the position of the second expansion area, and a mark of the position of the second obstacle; and the adjusting the pre-generated electronic map based on the new electronic map includes: adjusting the center position of the pre-generated electronic map to the center position of the new electronic map; adjusting the mark of the position of the first non-passable area based on the mark of the position of the second non-passable area; adjusting the mark of the position of the first expansion region based on the mark of position of the second expansion region; and adjusting the mark of the position of the first obstacle based on the mark of the position of the second obstacle.

In some embodiments, the generating the new electronic map using the current position as the center position and including a mark of the position of the second non-passable area, a mark of the position of the second expansion area, and a mark of the position of the second obstacle, includes: obtaining position information of a position where the stored expansion area is located; and generating the new electronic map using the current position as the center position and including the mark of the position of the second non-passable area, the mark of the position indicated by the obtained position information, and the mark of the position of the second obstacle.

In some embodiments, the preset adjustment condition includes a distance between the current position and the center position of the pre-generated electronic map being greater than a preset distance threshold.

In some embodiments, the method further includes any one of any one of the following: outputting the electronic map with completed adjustment in response to completing the adjustment; and outputting the pre-generated electronic map or the new electronic map at a preset frequency.

In some embodiments, the pre-generated electronic map is a pre-generated cost map, the new electronic map is a new cost map, the pre-generated cost map and the new cost map have a same size, and the cost map includes cells marked with cell values; and the adjusting the pre-generated electronic map based on the new electronic map includes: adjusting cell values of cells in the pre-generated cost map based on cell values of cells in the new cost map.

According to a second aspect, an embodiment of the present disclosure provides an apparatus for generating a map, the apparatus including: an acquiring unit configured to acquire current position information of a target device and a pre-generated electronic map, wherein a center position of the electronic map is a position indicated by the position information of the target device acquired when the electronic map is generated or before the electronic map is generated and an adjustment unit configured to, in response to determining that the current position indicated by the current position information meets a preset adjustment condition, perform the following adjustment step using a new thread to generate an electronic map with complete adjustment: generating a new electronic map using the current position as the center position, and adjusting the pre-generated electronic map based on the new electronic map.

In some embodiments, position of a first expansion area, the first expansion area being obtained by expanding a portion of a first obstacle located outside a first non-passable area, the first obstacle being an obstacle in an area of a predetermined size where the target device is located, and the first non-passable area being a non-passable area in the area of the predetermined size.

In some embodiments, the pre-generated electronic map is obtained using the following generation step: acquiring the position information of the target device; determining a position of a first obstacle and a first non-passable area within an area of a predetermined size where the position indicated by the position information is located; expanding a portion of the first obstacle located outside the first non-passable area to obtain a first expansion area; and generating an electronic map using the position indicated by the position information as the center position and including a mark of the position of the first obstacle, a mark of a position of the first expansion area, and a mark of a position of the first non-passable area.

In some embodiments, the first obstacle includes a first type obstacle and a second type obstacle, position information of the first type obstacle is obtained from a target electronic device, and position information of the second type obstacle is obtained from the target device; and the generating step further includes: storing position information of a position of an expansion area corresponding to a portion of the first type obstacle outside the first non-passable area.

In some embodiments, the adjustment unit includes a determination module configured to determine a position of a second obstacle in the new electronic map to be generated and a position of a second non-passable area; an expansion module configured to expand a portion of the second obstacle outside the second non-passable area to obtain a second expansion area; a first generation module configured to generate the new electronic map using the current position as the center position and including a mark of the position of the second non-passable area, a mark of the position of the second expansion area, and a mark of the position of the second obstacle; a first adjustment module configured to adjust the center position of the pre-generated electronic map to the center position of the new electronic map; a second adjustment module configured to adjust the mark of the position of the first non-passable area based on the mark of the position of the second non-passable area; a third adjustment module configured to adjust the mark of the position of the first expansion region based on the mark of position of the second expansion region; and a fourth adjustment module configured to adjust the mark of the position of the first obstacle based on the mark of the position of the second obstacle.

In some embodiments, the adjustment unit further includes an acquisition module configured to acquire position information of a position where the stored expansion area is located; and a second generation module configured to generate the new electronic map using the current position as the center position and including the mark of the position of the second non-passable area, the mark of the position indicated by the obtained position information, and the mark of the position of the second obstacle.

In some embodiments, the preset adjustment condition includes a distance between the current position and the center position of the pre-generated electronic map being greater than a preset distance threshold.

In some embodiments, the apparatus further includes any one of: a first output unit configured to the electronic map with completed adjustment in response to completing the adjustment; and a second output unit configured to output the pre-generated electronic map or the new electronic map at a preset frequency.

In some embodiments, the pre-generated electronic map is a pre-generated cost map, the new electronic map is a new cost map, the pre-generated cost map and the new cost map have a same size, and the cost map includes cells marked with cell values; and the adjusting the pre-generated electronic map based on the new electronic map includes: adjusting cell values of cells in the pre-generated cost map based on cell values of cells in the new cost map.

In a third aspect, an embodiment of the present disclosure provides a server for generating a map, including: one or more processors; and a storage apparatus storing one or more programs, where the one or more programs when executed by the one or more processors, cause the one or more processors to implement the method in any embodiment of the method for generating a map.

In a fourth aspect, an embodiment of the present disclosure provides a computer readable medium for generating a map, storing a computer program which, when executed by a processor, implements the method in any embodiment of the method for generating a map.

According to the method and apparatus for generating a map provided in the embodiments of the present disclosure, by acquiring current position information of a target device and a pre-generated electronic map, if the current position indicated by the current position information meets a preset adjustment condition, a new thread is used to perform the following adjustment step to generate an electronic map with complete adjustment: first, a new electronic map is generated using the current position as a center position, and then, the pre-generated electronic map is adjusted based on the new electronic map, thereby enriching a generation manner of the map.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION

Figure 1:
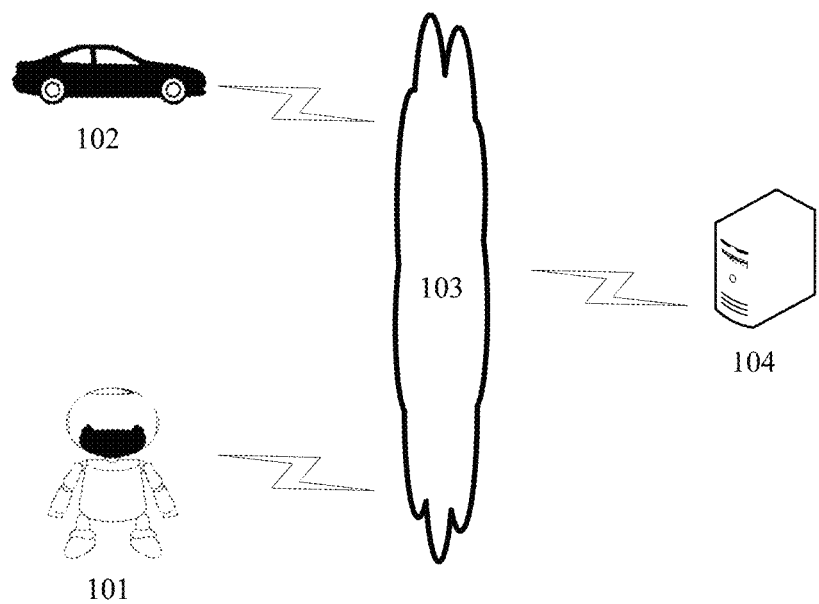
FIG. 1 is an example system architecture diagram in which embodiments of the present disclosure may be applied.

The present disclosure is described in further detail below with reference to the accompanying drawings and examples. It is to be understood that the specific embodiments described herein are merely illustrative of the related disclosure and are not restrictive of the disclosure. It is also to be noted that, for ease of description, only parts related to the disclosure are shown in the drawings.

It should be noted that the embodiments in the present disclosure and the features in the embodiments may be combined with each other without conflict. The present disclosure will now be described in detail with reference to the accompanying drawings and examples.

FIG. 1 illustrates an example system architecture 100 in which an embodiment of a method for generating a map or an embodiment of an apparatus for generating a map may be applied.

As shown in FIG. 1, the system architecture 100 may include terminal devices 101, 102, a network 103, and a server 104. The network 103 serves as a medium for providing a communication link between the terminal devices 101, 102 and the server 104. The network 103 may include various types of connections, such as wired, wireless communication links, or fiber optic cables, etc.

The user may interact with the server 104 through the network 103 using the terminal devices 101, 102 to receive or send messages, etc. The terminal devices 101, 102 may be provided with a robot operating system (ROS).

The terminal devices 101, 102 may be hardware or software. When the terminal devices 101 and 102 are hardware, the terminal devices 101 and 102 may be electronic devices capable of acquiring position information of an obstacle around the terminal devices 101 and 102, or may be electronic apparatuses capable of automatically performing certain tasks (for example, automatically determining a travel path). For example, the terminal devices 101 and 102 may be, but are not limited to, a medical robot, a military robot, a disability assisting robot, a cleaning robot, an autonomous driving vehicle, or the like. When the terminal devices 101 and 102 are software, they may be installed in the electronic devices listed above. The terminal devices may be implemented as a plurality of software pieces or software modules, such as software pieces or software modules for providing distributed services, or as a single software piece or software module, which is not specifically limited herein.

The server 104 may be a server that provides various services, such as a background path planning server that plans the mobile paths of the terminal devices 101, 102. The background path planning server may perform processing such as analysis on acquired or generated data such as an electronic map, and feed back a processing result (e.g., information of a path on which the terminal device can move) to the terminal device.

It should be noted that the method for generating a map provided in the embodiments of the present disclosure may be performed by the server 104, and accordingly, an apparatus for generating a map may be disposed in the server 104.

It should be noted that the server may be hardware or software. When the server is hardware, the server may be implemented as a distributed server cluster composed of multiple servers, or a single server. When the server is software, it may be implemented as a plurality of software pieces or software modules (e.g., software pieces or software modules for providing distributed services) or as a single software piece or software module, which is not specifically limited herein.

It should be understood that the number of terminal devices, networks and servers in FIG. 1 is merely illustrative. There may be any number of terminal devices, networks, and servers as desired for implementation. When an electronic device on which the information processing method is implemented does not require data transmission with other devices, the system architecture may not include a network.

Figure 2:
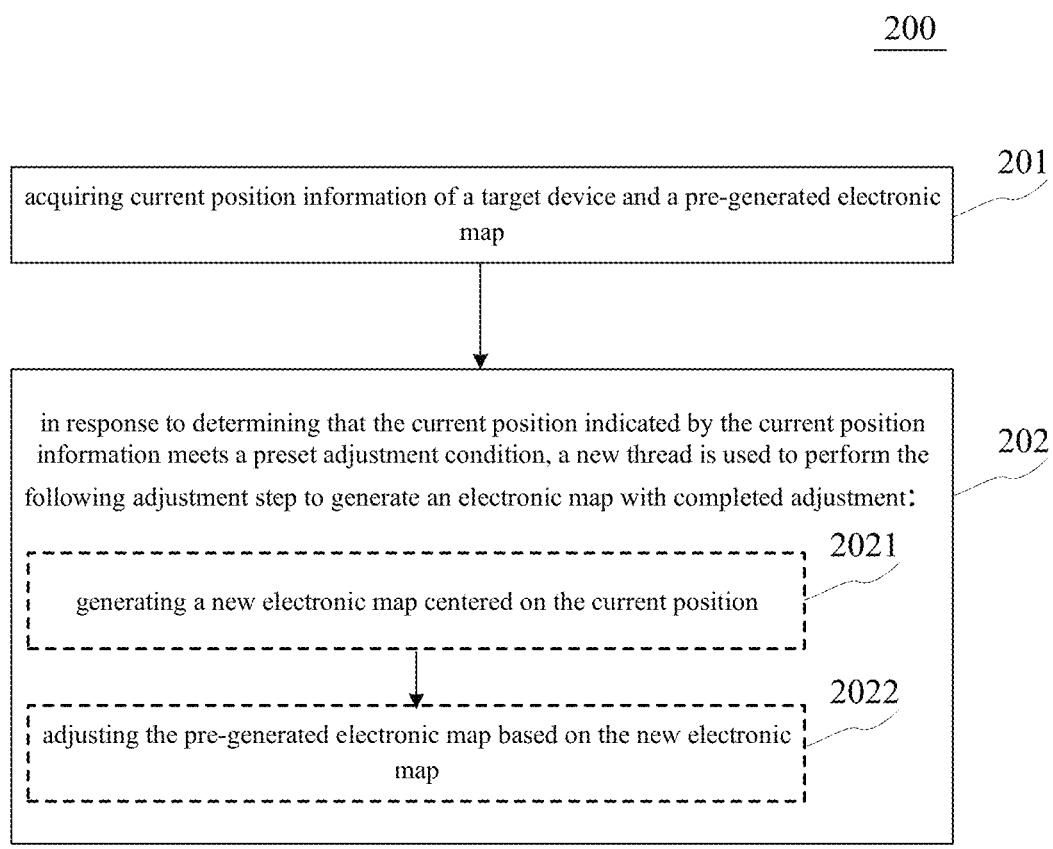
FIG. 2 is a flowchart of an embodiment of a method for generating a map according to the present disclosure.

With continuing reference to FIG. 2, a flow 200 of an embodiment of a method for generating a map according to the present disclosure is shown. The method for generating a map includes the following steps.

Step 201 includes: acquiring current position information of a target device and a pre-generated electronic map.

In the present embodiment, the execution body of the method for generating the map (for example, the server shown in FIG. 1) may acquire the current position information of the target device and the pre-generated electronic map from other electronic devices (for example, the terminal devices 101, 102 or other servers) or software modules by a wired connection or a wireless connection.

In the present embodiment, the above-mentioned target device (for example, the terminal device shown in FIG. 1) may be a mobile robot. Illustratively, the above-described target device may be, but is not limited to, any one of a mobile tank robot, an autonomous driving vehicle, drone, or the like. The current position information may be position information of the target device when the execution subject performs the acquisition operation. It will be appreciated that during the movement of the target device, the current position information changes with the movement of the target device. The electronic map may be a topographic map, a remote sensing image map, an elevation model map, various thematic maps, a cost map, or the like. The center position of the electronic map is a position indicated by the position information of the target device acquired by the execution body when the electronic map is generated or before the generation of the electronic map.

It should be noted that the attributes such as the size and resolution of the pre-generated electronic map may be set by a technician as required. Illustratively, the size of the pre-generated electronic map may be a square having a length of 50 meters and a width of 50 meters, and the resolution may be 0.05 meters. In practice, the size of the electronic map may be determined based on the moving speed of the target device described above. As an example, 10 to 20 times the moving speed (or the maximum moving speed) of the target device may be determined as the size of the electronic map. For example, when the maximum moving speed of the target device is 2 m/s, the length and width of the electronic map may be determined to be 40 m, respectively.

As an example, the electronic map may be generated using the following steps.

First, the execution body may load an electronic map (e.g., a high-precision electronic map) in a certain area (e.g., a square having a side length of 500 meters). The area includes an area where the position indicated by the pre-generated electronic map is located.

Then, the execution body may determine the position indicated by the position information of the target device on the loaded electronic map.

Finally, the execution body may cut a sub-electronic map of a preset size from the loaded electronic map and determine the sub-electronic map as the electronic map (i.e., a pre-generated electronic map) by taking the obtained position indicated by the position information of the target device as a central position.

In some alternative implementations of the present embodiment, the pre-generated electronic map includes a mark of the position of the first expansion area, where the first expansion area is obtained by expanding a portion of the first obstacle located outside the first non-passable area, the first obstacle is an obstacle in an area of a predetermined size where the target device is located, and the first non-passable area is an non-passable area in an area of a predetermined size. The first obstacle may be, but is not limited to, an object such as a road shoulder or a pole in the area of the predetermined size. The first non-passable area may be a non-passable area within the area of the predetermined size. For example, the first non-passable area may be, but is not limited to, an area where a sidewalk is located, an area where a parking space is located, and the like.

Here, the expansion process may be performed as follows.

First, the execution body or other electronic device may determine an area where the first obstacle intersects the ground.

Then, the execution body or other electronic device may determine a target area within the area intersecting the ground and outside the first non-passable area.

Finally, the execution body or other electronic device may determine an area located within a predetermined distance (for example, 1 meter) from the target area and outside the first non-passable area as the first expansion area.

Alternatively, when the electronic map is a cost map including cells, the expansion processing may be performed as follows.

First, the execution body or other electronic device may determine a minimum circumscribed polygon (which may be a minimum circumscribed circle or the like) of the area where the target device intersects the ground or the thickest portion of the target device according to the size of the target device. As an example, the expansion processing described above will be described with reference to the smallest circumscribed polygon.

Then, the execution body or other electronic device may determine an inscribed circle radius (denoted as radius 1) and a circumscribed circle radius (denoted as radius 2) of the minimum circumscribed polygon.

Thereafter, the above-mentioned execution body or other electronic device may start from points in the boundary of the region where the first obstacle is located. When the distance from the starting point to a point located outside the first non-passable area is smaller than the radius 1, this point is marked with a first mark (e.g., 253, or other number, character, or color); and when the distance between a point located outside the first non-passable area and the starting point is smaller than the radius 2, the cost value of this point is calculated by using the following equation (1):

$$\text{cost}=\exp(-\text{cost\_gain}\times(d-r1))\times 252 \qquad (1),$$

where, the cost is the cost value of the point. cost_gain is a value preset by a technician, and generally, the value of cost_gain may be 5 or 10. d is the distance between the calculated point and the starting point. r1 is the radius of the inscribed circle (i.e., radius 1) of the polygon.

Finally, the execution body or other electronic device may determine an area located outside the first non-passable area and in an area formed by points whose distance from the start point is smaller than the radius 2, as the first expansion area. In addition, the execution body obtains the cost value of each point.

Here, the mark may be a cost value. For example, if the cost value of the first obstacle region is 254, the mark of the first obstacle region may be 254; the mark of each point in the first expansion region may be the cost value of the point determined in the manner described above; and the mark of the location of the first non-passable area may be the value of the first non-passable area (e.g., 255, etc.).

It should be noted that when the electronic map is a cost map including cells, the cell value (i.e., the cost value) of each cell may be the cost value of the point having the largest value among the cost values of points in this cell.

Here, the first expansion region is obtained by expanding a portion of the first obstacle located outside the first non-passable region. Only a portion of the first obstacle located outside the first non-passable region may be expanded without performing expansion processing on a portion of the first obstacle located inside the first non-passable region; alternatively, the portion of the first obstacle located outside the first non-passable area and the portion of the first obstacle located inside the first non-passable area may be expanded. It will be appreciated that when only the portion of the first obstacle located outside the first non-passable area is subjected to the expansion processing, and the portion of the first obstacle located inside the first non-passable area is not subjected to the expansion processing, the calculation amount can be reduced and the calculation speed can be increased.

Alternatively, the above marks may be other letters, colors, and the like.

Step 202 includes: in response to determining that the current position indicated by the current position information meets a preset adjustment condition, a new thread is used to perform the following adjustment step to generate an electronic map with completed adjustment.

In the present embodiment, in response to determining that the current position indicated by the current position information meets the preset adjustment condition, the execution body may perform the following adjustment step (including adjustment steps 2021 and 2022) by using the new thread based on the current position information and the electronic map obtained in step 201 to generate the electronic map with complete adjustment.

In the present embodiment, the preset adjustment condition may be various pre-set conditions for adjusting the pre-generated electronic map. The new thread may be a thread created by the execution body when it is determined that the current position represented by the current position information meets a preset adjustment condition, and the new thread may be used only to perform the adjustment step. It will be appreciated that by performing the adjustment step with the new thread, the impact on other operations being performed by the execution body can be reduced, and the real-time performance of operations such as electronic map generation, display, update, and adjustment can be improved.

In some alternative implementations of the present embodiment, the preset adjustment condition may include that the distance between the current position and the center position of the pre-generated electronic map is greater than a preset distance threshold. Here, the distance threshold may be determined by a technician according to actual requirements. For example, the distance threshold may be proportional to the moving speed of the target device. It will be appreciated that by setting the distance threshold value when the target device is in a low-speed or still state, frequently performing the adjustment step by the execution subject may be avoided, so as to reduce the calculation amount.

In some alternative implementations of the embodiment, the preset adjustment condition may include that the current position information is changed, that is, the current position information obtained this time is different from the current position information obtained last time.

The adjustment step 2021 generates a new electronic map centered on the current position.

In the present embodiment, the execution body can generate a new electronic map centered on the current position. The new electronic map and the pre-generated electronic map may have the same size. The size of the new electronic map may alternatively be a predetermined proportion of the size of the pre-generated electronic map (for example, the length and width of the new electronic map are 1.5 times the length and width of the pre-generated electronic map, respectively).

As an example, the above adjustment step 2021 may be performed as follows.

First, the execution body may load an electronic map (e.g., a high-precision electronic map) in a certain area (e.g., a square area with a side length of 500 meters). Further, the area includes an area where the position indicated by the new electronic map to be generated in the adjustment step 2021 is located.

Then, the execution body may determine the current position on the loaded electronic map.

Finally, the execution body may cut a sub-electronic map of a predetermined size on the loaded electronic map by using the current position as a center position, and determine the sub-electronic map as the new electronic map.

The adjustment step 2022 includes adjusting the pre-generated electronic map based on the new electronic map.

In the embodiment, the execution body may adjust the pre-generated electronic map based on the new electronic map, and the pre-generated electronic map is adjusted to obtain the electronic map with complete adjustment.

As an example, the execution body may adjust the pre-generated electronic map to an electronic map identical to the new electronic map. When the size of each of the pre-generated electronic map and the new electronic map is a square having a side length of 50 meters, the execution body may adjust a predetermined area including the center position on the pre-generated electronic map to an area identical to a corresponding area of the new electronic map. For example, the execution body may adjust a circular area with the center position as the circular area and the radius of 49 meters (or other values) in the pre-generated electronic map to the circular area with the center position of the new electronic map as the circular area and the radius of 49 meters in the new electronic map.

In some alternative implementations of the present embodiment, the method may further include any one of: outputting an electronic map with the completed adjustment in response to the completion of the adjustment; or outputting a pre-generated electronic map or a new electronic map at a preset frequency. Here, the preset frequency may be a preset frequency (for example, 10 Hz), and the value of the preset frequency may be determined by a technician according to actual requirements.

In some alternative implementations of the present embodiment, the pre-generated electronic map is a pre-generated cost map, the new electronic map is a new cost map, the size of the pre-generated cost map is the same as that of the new cost map, and the cost map including cells marked with cell values; and adjusting the pre-generated electronic map based on the new electronic map, including: adjusting the cell values of the cells in the pre-generated cost map based on the cell values of the cells in the new cost map. Here, the cost map can generally represent the environment around the target device in the form of a grid map in which the value represents the cost value that the target device passes through the cell (e.g., free area value is 0, obstacle area value is 254, unknown area value is 255, etc.). The greater the cost value is, the greater the risk factor of passing the cell is. The execution body or other device may calculate the cost values of the cells in the obstacle area based on the outline of the target device to determine the cell values (i.e., the cost value) of cells constituting the cost map.

Here, the execution body may adjust the cell value of each cell in the pre-generated cost map to the cell value of the cell corresponding to this cell in the new cost map. When the size of each of the pre-generated electronic map and the new electronic map is a square having a side length of 50 meters, the execution body may adjust the predetermined area of the pre-generated electronic map including the center position to an area identical to the corresponding area of the new electronic map. For example, the execution body may adjust a square area with the center position and the side length of 49 (or other values) in the pre-generated electronic map to a square area with the center position of the new electronic map and the side length of 49 in the new electronic map.

Figure 3:
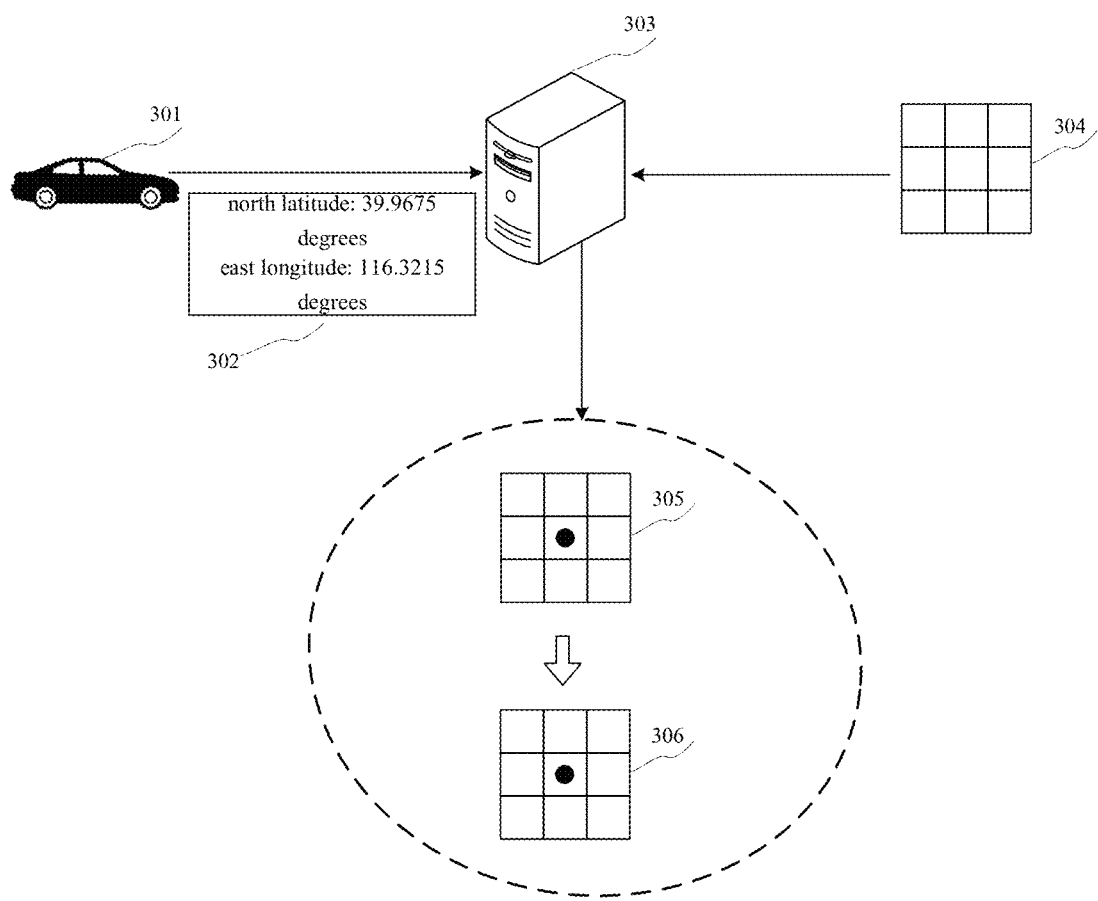
FIG. 3 is a schematic diagram of an application scenario of a method for generating a map according to the present disclosure.

With continued reference to FIG. 3, FIG. 3 is a schematic diagram of an application scenario of a method for generating a map according to the present embodiment. In the application scenario of FIG. 3, the server 303 (i.e., the above-mentioned execution body) first acquires the current position information 302 of the autonomous driving vehicle 301 (i.e., the target device) and the pre-generated electronic map 304, where the central location of the electronic map 304 is a location indicated by the position information most recently acquired by the server 303. For example, the center position of the electronic map 304 may be "north latitude: 39.9675 degrees, east longitude: 116.3215 degrees." Then, the server 303 determines that the current position "N latitude: 39.9674 degrees, E longitude: 116.3214 degrees" indicated by the current position information 302 meets the preset adjustment condition (for example, the distance between the current position and the center position of the pre-generated electronic map is greater than 1 meter), executes the following adjustment steps using a new thread: generating a new electronic map 305 using the current position "N latitude: 39.9674 degrees, E longitude: 116.3214 degrees" as the center position, and adjusts the pre-generated electronic map 304 based on the new electronic map 305 to generate the electronic map 306 with complete adjustment.

According to the method provided in the above embodiment of the present disclosure, by acquiring the current position information of the target device and the pre-generated electronic map, if the current position represented by the current position information meets a preset adjustment condition, a new thread is used to perform the following adjustment step: first, a new electronic map is generated with the current position as a center position, and then, the pre-generated electronic map is adjusted based on the new electronic map to generate an electronic map with complete adjustment, thereby enriching the generation mode of the map, improving the real-time performance of the map generation, and reducing the operation amount of the device.

Figure 4:
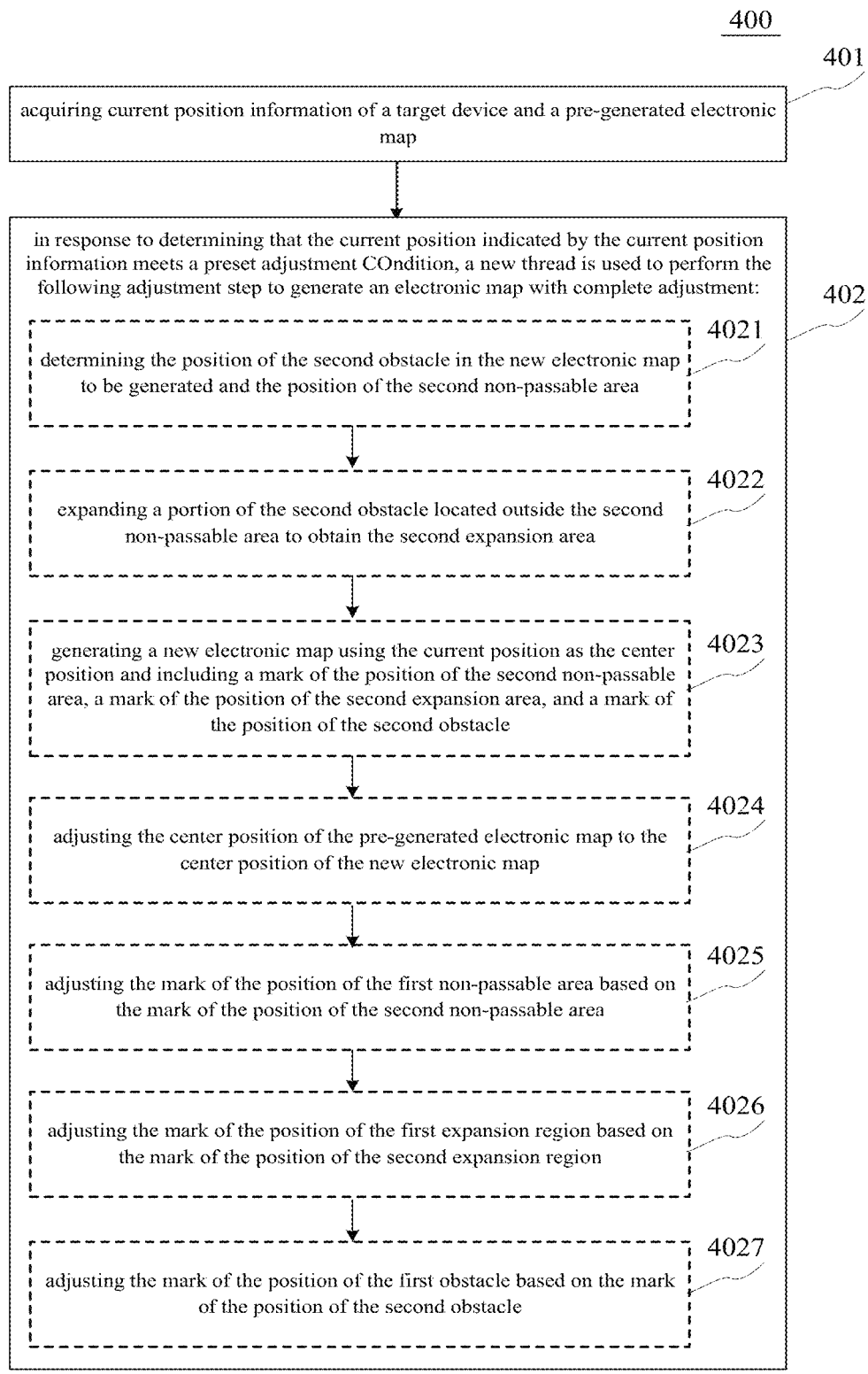
FIG. 4 is a flowchart of yet another embodiment of a method for generating a map according to the present disclosure.

Referring further to FIG. 4, there is shown a flow 400 of yet another embodiment of a method for generating a map. The flow 400 of the method for generating a map includes the following steps.

Step 401 includes: acquiring current position information of a target device and a pre-generated electronic map.

In the present embodiment, step 401 is substantially identical to step 201 in the corresponding embodiment of FIG. 2, and details are not described herein.

In some alternative implementations of the present embodiment, the pre-generated electronic map may be obtained by the following generation steps: obtaining the position information of the target device; determining a position of a first obstacle and a first non-passable area within an area of a predetermined size in which the position indicated by the position information is located; expanding a portion of the first obstacle outside the first non-passable area to obtain a first expansion area; generating an electronic map using a position indicated by the position information as a center position, including a mark of a position of the first obstacle, a mark of the position of the first expansion area, and a mark of the position of the first non-passable area. The first obstacle may be, but is not limited to, an object such as a road shoulder or a pole in an area of the predetermined size. The first non-passable area may be a non-passable area within the area of the predetermined size. For example, the first non-passable area may be, but is not limited to, an area where a sidewalk is located, an area where a parking space is located, and the like.

Here, the expansion processing may be performed as follows.

First, the execution body or other electronic device may determine an area where the first obstacle intersects the ground.

Then, the execution body or other electronic device may determine a target area within the area intersecting the ground and outside the first non-passable area.

Finally, the execution body or other electronic device may determine an area located within a predetermined distance (for example, 1 meter) from the target area and outside the first non-passable area as the first expansion area.

Alternatively, when the electronic map is a cost map composed of cells, the expansion processing may be performed as follows.

First, the execution body or other electronic device may determine a minimum circumscribed polygon (which may be a minimum circumscribed circle or the like) of the area where the target device intersects the ground or the thickest portion of the target device according to the size of the target device. As an example, the expansion processing will be described with reference to the smallest circumscribed polygon.

Then, the execution body or other electronic device may determine an inscribed circle radius (denoted as radius 1) and a circumscribed circle radius (denoted as radius 2) of the minimum circumscribed polygon.

Thereafter, the above-mentioned execution body or other electronic device may using a point in the boundary of the region where the first obstacle is located as a starting point. When the distance between a point located outside the first non-passable area and the starting point is smaller than the radius 1, this point is marked with a first mark (e.g., 253, or other number, character, or color); and when the distance between a point located outside the first non-passable area and the starting point is smaller than the radius 2, the cost value of this point is calculated by using the following equation (1):

$$\text{cost} = \exp(-\text{cost\_gain} \times (d-r1)) \times 252 \qquad (1),$$

where, the cost is the cost value of the point. cost_gain is a value preset by a technician, and generally, the value of cost_gain may be 5 or 10. d is the distance between the calculated point and the starting point. R1 is the radius of the inscribed circle (i.e., radius 1) of the polygon.

Finally, the execution body or other electronic device may determine an area located outside the first non-passable area and in an area formed by points whose distance to the start point is smaller than the radius 2, as thee first expansion area. In addition, the execution body obtains the cost value of each point.

Here, the mark may be a cost value. For example, if the cost value of the first obstacle region is 254, the mark of the first obstacle region may be 254; the mark of each point in the first expansion region may be the cost value of the point determined in the manner described above; the mark of the location of the first non-passable area may be the value of the first non-passable area (e.g., 255, etc.).

It should be noted that when the electronic map is a cost map composed of cells, the cell value (i.e., the cost value) of each cell may be the cost value of the point having the largest values among the cost values of points included in the cell.

It will be appreciated that when only a portion of the first obstacle located outside the first non-passable area is subjected to expansion processing, and a portion of the first obstacle located inside the first non-passable area is not subjected to the expansion processing, the calculation amount of the execution body can be reduced.

Alternatively, the above marks may be other letters, colors, and the like.

In some alternative implementations of the present embodiment, the first obstacle may include a first type obstacle and a second type obstacle, the position information of the first type obstacle is acquired from the target electronic device, and the position information of the second type obstacle is acquired from the target device; and the generating step further includes: storing the position information of the position of the expansion area corresponding to the portion of the first type obstacle located outside the first non-passable area. The target electronic device may be an electronic device storing the position information of the first type of obstacle. The position information of the second type obstacle may be the position information of the obstacle within a certain range of the target device acquired in real time by the target device or other devices. For example, the position information of the second type obstacle may be point cloud information (including the position information of the obstacle) of the obstacle surrounding the target device acquired by the target device using the sensor. The position information of the first type obstacle may be stored by the target electronic device as follows.

In a first step, the target electronic device may load a high-precision map within a certain area where the target electronic device is located.

In a second step, the target electronic device may generate a blank global static layer map having the same size and resolution as the high-precision map. The global static layer may be generated based on the Costmap_2d algorithm. Costmap_2d algorithm is an open source algorithm in the robot operating system.

In a third step, the target electronic device may mark an obstacle (i.e., the first type obstacle) in the high-precision map in the global static layer map. For example, an obstacle is marked with 254.

It will be appreciated that through the above steps, the position information of the first type obstacle can be stored in the global static layer map of the target electronic device.

Optionally, after the target electronic device performs the third step, the target electronic device may further perform the following fourth step and fifth step.

In a fourth step, the obstacle in the high-precision map is expanded to obtain an expansion area.

In a fifth step, the expansion area is marked in the global static layer map.

It will be appreciated that through the above steps, the position information of the expansion area can be stored in the global static layer map of the target electronic device. By storing the above-mentioned position information, the subsequent calculation amount can be reduced. Furthermore, by performing uniform expansion processing on the obstacle in the high-precision map and storing the position information of the expansion area, the repeated expansion processing on the obstacle in the high-precision map can be avoided, thereby further reducing the calculation amount of subsequent adjustment or updating of the cost map.

Step 402 includes: in response to determining that the current position indicated by the current position information meets a preset adjustment condition, a new thread is used to perform the following adjustment step to generate an electronic map with complete adjustment.

In the present embodiment, in response to determining that the current position indicated by the current position information meets the preset adjustment condition, the execution body may perform the following adjustment step (including the adjustment step 4021-4027) by using the new thread based on the current position information and the electronic map obtained in step 401 to generate the electronic map with complete adjustment.

In the present embodiment, the preset adjustment condition may be various pre-set conditions for adjusting the pre-generated electronic map. The new thread may be a thread created by the execution body when it is determined that the current position represented by the current position information meets a preset adjustment condition, and the new thread may be used only to perform the adjustment step. It will be appreciated that by performing the adjustment step as described above with a new thread, the impact on other operations being performed by the above-mentioned execution body can be reduced, which is beneficial to the real-time performance of operations such as generation, display, update, and adjustment of the electronic map.

The adjustment step 4021 includes determining the position of the second obstacle in the new electronic map to be generated and the position of the second non-passable area.

In the present embodiment, the execution body may determine the position of the second obstacle in the new electronic map to be generated and the position of the second non-passable area. The position of the second obstacle may be the position of an obstacle in the new electronic map to be generated. The second obstacle may be, but is not limited to, an object such as a road shoulder, a pole, or the like in the new electronic map to be generated. The second non-passable area may be an non-passable area within the new electronic map to be generated as described above. For example, the second non-passable area may be, but is not limited to, an area where a sidewalk is located, an area where a parking space is located, and the like.

An adjustment step 4022 includes: expanding a portion of the second obstacle located outside the second non-passable area to obtain the second expansion area.

In the present embodiment, the execution body may perform expansion processing on a portion of the second obstacle located outside the second non-passable area to obtain the second expansion area.

Here, the expansion processing may have a processing step similar to that mentioned in step 401 above.

It will be appreciated that when only a portion of the second obstacle located outside the second non-passable area is subjected to the expansion processing, and a portion of the second obstacle located inside the second non-passable area is not subjected to the expansion processing, the calculation amount of the above-mentioned execution body can be reduced.

The adjustment step 4023 includes generating a new electronic map using the current position as the center position and including a mark of the position of the second non-passable area, a mark of the position of the second expansion area, and a mark of the position of the second obstacle.

In the present embodiment, the execution body may generate a new electronic map using the current position as the center position and including a marker of the position of the second non-passable area, a marker of the position of the second expansion area, and a marker of the position of the second obstacle. The new electronic map and the pre-generated electronic map may have the same size. The size of the new electronic map may alternatively be a predetermined proportion of the size of the pre-generated electronic map (for example, the length and width of the new electronic map are 1.5 times the length and width of the pre-generated electronic map, respectively).

The adjustment step 4024 includes adjusting the center position of the pre-generated electronic map to the center position of the new electronic map.

In the present embodiment, the execution body may adjust the center position of the pre-generated electronic map to the center position of the new electronic map.

The adjustment step 4025 includes adjusting the mark of the position of the first non-passable area based on the mark of the position of the second non-passable area.

In the present embodiment, the execution body may adjust the mark of the position of the first non-passable area based on the mark of the position of the second non-passable area.

The adjustment step 4026 includes adjusting the mark of the position of the first expansion region based on the mark of the position of the second expansion region.

In the present embodiment, the execution body may adjust the mark of the position of the first expansion region based on the mark of the position of the second expansion region.

The adjustment step 4027 includes adjusting the mark of the position of the first obstacle based on the mark of the position of the second obstacle.

In the present embodiment, the execution body may adjust the mark of the position of the first obstacle based on the mark of the position of the second obstacle.

In practice, the new electronic map described above may be a static layer in a cost map generated based on the Costmap_2d algorithm. The execution body may update the dynamic layer by using the dynamic layer thread, and update the static layer by using the static layer thread, thereby realizing independent updating of the dynamic layer and the static layer. In the updating process of the static layer, real-time updating of the dynamic layer is not affected, so that flexibility and real-time performance of electronic map generation are ensured. Here, illustratively, updating the dynamic layer may include: receiving obstacle information in the form of a point cloud from the target device, marking the cost value of the point cloud of the obstacle projected to the passable area in the electronic map, and performing expansion processing. Alternatively, the above steps may be performed on each frame of point cloud data to ensure that the obstacle information can be updated into the electronic map in real time. Updating the static layer may include the adjustment step 4021 to the adjustment step 4027 described above.

It will be appreciated that the new electronic map may represent an area of the same size as the pre-generated electronic map. Therefore, the execution body uses the mark of the position of the second non-passable area, the mark of the position of the second expansion area, and the mark of the position of the second obstacle to replace the mark of the position of the first non-passable area, the mark of the position of the first expansion area, and the mark of the position of the first obstacle on the same positions of the electronic map respectively.

Alternatively, when the electronic map is a cost map composed of a plurality of layers (for example, a dynamic layer and a static layer may be included), a mark of the position of the second non-passable area of the new electronic map, a mark of the position of the second expansion area, and a mark of the position of the second obstacle may be included in the static layer of the new cost map; the mark of the position of the first non-passable area, the mark of the position of the first expansion area, and the mark of the position of the first obstacle on the same positions of the pre-generated electronic map may be included in the static layer of the pre-generated cost map. In this case, the execution body may also update (or replace) the static layer of the pre-generated cost map with the static layer of the new cost map, thereby implementing the adjustment step 4025 to adjusting step 4027 to obtain the electronic map with complete adjustment.

In some alternative implementations of the present embodiment, the generation of a new electronic map using the current position as the center position and including a mark of a position of the second non-passable area, a mark of a position of the second expansion area, and a mark of a position of the second obstacle, includes: obtaining stored position information of a position of the expansion area; generating a new electronic map using the current position as the center position and including a mark of the position of the second non-passable area, a mark of the position indicated by the acquired position information, and a mark of the position of the second obstacle.

It will be appreciated that by obtaining the stored position information of the position where the expansion area is located, the calculation amount of the above-mentioned execution body can be reduced, thereby contributing to increasing the generation speed of the electronic map.

As can be seen from FIG. 4, compared with the embodiment corresponding to FIG. 2, the flow 400 of the method for generating a map in the present embodiment highlights a step of expanding a portion of an obstacle located outside a non-passable area, a step of storing position information, and a step of generating a pre-generated electronic map. As a result, more expansion processing methods or pre-generated generation steps of the electronic map can be introduced in the solution described in the embodiment, thereby further enriching the generation methods of the electronic map and helping to improve the generation speed of the electronic map; and by storing the position information, the generation speed of the electronic map is further improved.

Figure 5:
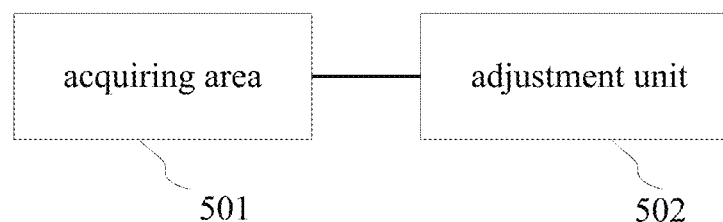
FIG. 5 is a schematic structural diagram of an embodiment of an apparatus for generating a map according to the present disclosure.

With further reference to FIG. 5, as an implementation of the method shown in above figures, the present disclosure provides an embodiment of an apparatus for generating a map, which corresponds to the method embodiment shown in FIG. 2. In addition to the technical features and effects described below, the apparatus embodiment may include the technical features and effects corresponding to the method embodiment shown in FIG. 2. The apparatus is particularly applicable to various electronic devices.

As shown in FIG. 5, the apparatus 500 for generating a map according to the present embodiment includes an acquiring area 501 and an adjustment unit 502. The acquiring unit 501 is configured to acquire the current position information of the target device and the pre-generated electronic map, where the center position of the electronic map is a position indicated by the position information of the target device acquired at the time of generation of the electronic map or before generation; and the adjustment unit 502 is configured to, in response to determining that the current position indicated by the current position information meets a preset adjustment condition, perform the following adjustment step using the new thread to generate an electronic map with completed adjustment by generating a new electronic map using the current position as the center position, and adjusting the pre-generated electronic map based on the new electronic map.

In the present embodiment, the acquiring unit 501 of the apparatus 500 for generating a map may acquire the current position information of the target device and the pre-generated electronic map from other electronic devices (such as the terminal devices 101, 102 or other servers) or the software module through a wired connection or a wireless connection.

In the present embodiment, the target device (for example, the terminal device shown in FIG. 1) may be an intelligent robot having self-organization, self-operation, and self-planning. Illustratively, the target device may be, but is not limited to, any one of a mobile tank robot, an autonomous driving vehicle, drone, or the like, and may be another mobile robot. The current position information may be position information of the target device when the apparatus performs the acquisition operation. It will be appreciated that during the movement of the target device, the current position information changes with the movement of the target device. The electronic map may be a topographic map, a remote sensing image map, an elevation model map, various thematic maps, a cost map, or the like. The center position of the electronic map is a position indicated by the position information of the target device obtained by the apparatus at the time of generating the electronic map or before generating the electronic map.

In the present embodiment, the adjustment unit 502 may perform the following adjustment step using the new thread based on the current position information and the electronic map obtained in the receiving unit 501 so as to generate an electronic map with completed adjustment: generating a new electronic map using the current position as the center position, and adjusting the pre-generated electronic map based on the new electronic map. Here, the preset adjustment condition may be various pre-set conditions for adjusting the pre-generated electronic map. The new thread may be a thread created by the apparatus when it is determined that the current position represented by the current position information meets a preset adjustment condition. It will be appreciated that by performing the adjustment step as described above with the new thread, the impact on other operations being performed by the d execution body can be reduced, and the real-time performance of operations such as generation, display, update, and adjustment of the electronic map can be improved.

In some alternative implementations of the present embodiment, the preset adjustment condition may include that the distance between the current position and the center position of the pre-generated electronic map is greater than a preset distance threshold. Here, the distance threshold may be determined by a technician according to actual requirements. For example, the distance threshold may be proportional to the moving speed of the target device. It will be appreciated that by setting the distance threshold value when the target device is in a low-speed or still state, the apparatus can avoid performing the adjustment step frequently to reduce the calculation amount.

In some alternative implementations of the present embodiment, the pre-generated electronic map includes a mark of the position of the first expansion area, where the first expansion area is obtained by expanding a portion of the first obstacle located outside the first non-passable area, the first obstacle is an obstacle in an area of a predetermined size where the target device is located, and the first non-passable area is an non-passable area in an area of a predetermined size. The first obstacle may be, but is not limited to, an object such as a road shoulder, a pole, or the like in an area of the predetermined size. The first non-passable area may be a non-passable area within the aforementioned area of the predetermined size. For example, the first non-passable area may be, but is not limited to, an area where a sidewalk is located, an area where a parking space is located, and the like.

In some alternative implementations of the present embodiment, the pre-generated electronic map is obtained by the following generation steps: obtaining the position information of the target device; determining a position of a first obstacle and a first non-passable area within an area of a predetermined size where the position indicated by the position information is located; expanding a portion of the first obstacle outside the first non-passable area to obtain a first expansion area; generating a mark an electronic map using the position indicated by the position information as a center position, and including a mark of a position of the first obstacle, a mark of the position of the first expansion area, and a mark of the position of the first non-passable area. The first obstacle may be, but is not limited to, an object such as a road tooth, a tree pit, or a pole in an area of the predetermined size. The first non-passable area may be a non-passable area within the aforementioned area of the predetermined size. For example, the first non-passable area may be, but is not limited to, an area where a sidewalk is located, an area where a parking space is located, and the like.

In some alternative implementations of the present embodiment, the first obstacle includes a first type obstacle and a second type obstacle, the position information of the first type obstacle is obtained from the target electronic device, and the position information of the second type obstacle is obtained from the target device; and the generating step further includes: storing the position information of the position of the expansion area corresponding to the portion of the first type obstacle located outside the first non-passable area.

In some alternative implementations of the present embodiment, the adjustment unit 502 may include a determination module (not shown) configured to determine the position of the second obstacle and the position of the second non-passable area in the new electronic map to be generated; an expansion module (not shown) configured to expand a portion of the second obstacle located outside the second non-passable area to obtain the second expansion area; a first generation module (not shown) configured to generate a new electronic map using a current position as a center position and including a marker of a position of a second non-passable area, a marker of a position of a second expansion area, and a marker of a position of a second obstacle; a first adjustment module (not shown) configured to adjust a center position of the pre-generated electronic map to a center position of a new electronic map; a second adjustment module (not shown) configured to adjust the mark of the position of the first non-passable area based on the mark of the position of the second non-passable area; a third adjustment module (not shown) configured to adjust the marker of the position of the first expansion region based on the marker of the position of the second expansion region; a fourth adjustment module (not shown) configured to adjust the mark of the position of the first obstacle based on the mark of the position of the second obstacle.

In some alternative implementations of the present embodiment, the adjustment unit 502 may further include an acquisition module (not shown) configured to acquire position information of a position in which the stored expansion area is located; a second generation module (not shown in the figure) configured to generate a new electronic map using the current position as the center position and including a marker of the position of the second non-passable area, a marker of the position indicated by the acquired position information, and a marker of the position of the second obstacle.

In some alternative implementations of the present embodiment, the apparatus 500 may further include any one of: a first output unit (not shown) configured to output an electronic map with completed adjustment in response to the completion of the adjustment; a second output unit (not shown) configured to output a pre-generated electronic map or a new electronic map at a preset frequency. Here, the preset frequency may be a preset frequency (for example, 10 Hz), and the value of the preset frequency may be determined by a technician according to actual requirements.

In some alternative implementations of the present embodiment, the pre-generated electronic map may be a pre-generated cost map, the new electronic map is a new cost map, the size of the pre-generated cost map is the same as that of the new cost map, and the cost map consists of cells marked with cell values; and the adjustment unit 502 includes an adjustment module configured to adjust the cell values of the cells in the pre-generated cost map based on the cells value of the cells in the new cost map. Here, the cost map can generally represent the environment around the target device in the form of a grid map in which the value represents the cost value that the target device through the cell (e.g., free area value is 0, obstacle area value is 254, unknown area value is 255, etc.). The greater the cost value is, the greater the risk factor through the cell is. The apparatus or other device may calculate the cost value of the cell in the obstacle area based on the outline of the target device to determine the cell value (i.e., the cost value) of cells constituting the cost map.

It should be noted that the apparatus embodiment corresponds to the method embodiment shown in FIG. 2, and may have technical features corresponding to the method embodiment shown in FIG. 2.

According to the apparatus provided in the above embodiment of the present disclosure, the current position information of the target device and the pre-generated electronic map are acquired by the acquiring unit 501. If the current position indicated by the current position information meets a preset adjustment condition, the adjusting unit 502 performs the following adjustment step by using a new thread to generate an electronic map with complete adjustment: first, a new electronic map is generated with the current position as a center position, and then, the pre-generated electronic map is adjusted based on the new electronic map, thereby enriching a generation manner of the map.

Figure 6:
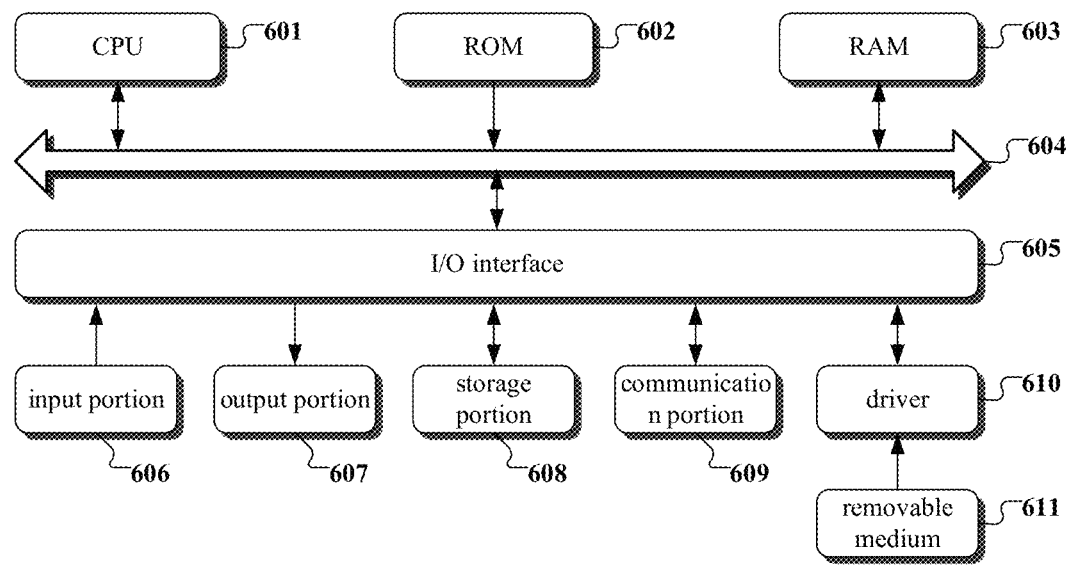
FIG. 6 is a schematic structural diagram of a computer system adapted for implementing a server of an embodiment of the present disclosure.

Referring now to FIG. 6, there is shown a schematic structural diagram of a computer system 600 adapted for implementing a server of an embodiment of the present disclosure. The server shown in FIG. 6 is merely an example and should not impose any limitations on the functionality and scope of embodiments of the present disclosure.

As shown in FIG. 6, the computer system 600 includes a central processing unit (CPU) 601, which may perform various appropriate actions and processes according to a program stored in a read-only memory (ROM) 602 or a program loaded into a random access memory (RAM) 603 from a storage portion 608. The RAM 603, also stores various programs and data required by operations of the system 600. The CPU 601, ROM 602, and RAM 603 are connected to each other via bus 604. An input/output (I/O) interface 605 is also connected to bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring area and an adjustment unit. Here, the names of these units do not constitute a limitation to such units themselves. For example, the acquiring area may also be described as a unit for acquiring the current position information of the target device and the pre-generated electronic map.

In another aspect, the present disclosure further provides a computer-readable medium. The computer-readable medium may be the computer-readable medium included in the server in the above described embodiments, or a stand-alone computer-readable medium not assembled into the server. The computer-readable medium stores one or more programs. The one or more programs, when executed by the server, cause the server to acquire current position information of the target device and a pre-generated electronic map, where a central position of the electronic map is a position indicated by the position information of the target device acquired at or before generation of the electronic map; in response to determining that the current position indicated by the current position information meets a preset adjustment condition, using a new thread to perform the following adjustment step to generate an electronic map with complete adjustment: generating a new electronic map using the current position as a center position, and adjusting the pre-generated electronic map based on the new electronic map.

The above description is only a preferred embodiment of the disclosure and a description of the technical principles employed. It should be understood by those skilled in the art that the scope of the invention referred to in this disclosure is not limited to the technical solutions formed by specific combinations of the above-mentioned technical features, but also covers other technical solutions formed by any combination of the above-mentioned technical features or equivalents thereof without departing from the inventive concept. For example, the above-mentioned features and the technical features having similar functions disclosed in the present disclosure are replaced with each other.

What is claimed is:

1. A method for generating a map, comprising:
   acquiring current position information of a target device and a pre-generated electronic map, wherein a center position of the electronic map is a position indicated by the position information of the target device acquired when the electronic map is generated or before the electronic map is generated;
   in response to determining that the current position indicated by the current position information meets a preset adjustment condition, using a new thread is to perform the following adjustment step to generate an electronic map with complete adjustment: generating a new electronic map using the current position as the center position, and adjusting the pre-generated electronic map based on the new electronic map;
   outputting the electronic map with completed adjustment in response to completing the adjustment; and
   outputting the pre-generated electronic map or the new electronic map at a preset frequency,
   wherein in response to determining that the current position indicated by the current position information meets a preset adjustment condition, using a new thread is to perform the following adjustment step to generate an electronic map with complete adjustment comprises:
      in response to determining that a distance between the current position and the center position of the pre-generated electronic map is greater than a preset distance threshold, using a new thread to perform the adjustment step to generate an electronic map with complete adjustment, wherein the distance being set to be proportional to a moving speed of the target device, and
   wherein the method further comprises:
      expanding a portion of a first obstacle located outside a first non-passable area, the first obstacle being an obstacle in an area of a predetermined size where the target device is located, and the first non-passable area being a non-passable area in the area of the predetermined size;
      obtaining a first expansion area based on expanding the portion of the first obstacle; and
      providing, in the pre-generated electronic map, a mark of the position of the first expansion area.

2. The method according to claim 1, wherein the pre-generated electronic map is obtained using the following generation step:
   acquiring the position information of the target device;
   determining a position of a first obstacle and a first non-passable area within an area of a predetermined size where the position indicated by the position information is located;
   expanding a portion of the first obstacle located outside the first non-passable area to obtain a first expansion area; and
   generating an electronic map using the position indicated by the position information as the center position and including a mark of the position of the first obstacle, a mark of a position of the first expansion area, and a mark of a position of the first non-passable area.

3. The method according to claim 2, wherein the first obstacle includes a first type obstacle and a second type obstacle, position information of the first type obstacle is obtained from a target electronic device, and position information of the second type obstacle is obtained from the target device; and
   the generating step further comprises:
      storing position information of a position of an expansion area corresponding to a portion of the first type obstacle outside the first non-passable area.

4. The method according to claim 2, the generating a new electronic map using the current position as the center position, comprising:
   determining a position of a second obstacle in the new electronic map to be generated and a position of a second non-passable area;
   expanding a portion of the second obstacle outside the second non-passable area to obtain a second expansion area; and
   generating the new electronic map using the current position as the center position and including a mark of the position of the second non-passable area, a mark of the position of the second expansion area, and a mark of the position of the second obstacle; and
   the adjusting the pre-generated electronic map based on the new electronic map comprises:
      adjusting the center position of the pre-generated electronic map to the center position of the new electronic map;
      adjusting the mark of the position of the first non-passable area based on the mark of the position of the second non-passable area;
      adjusting the mark of the position of the first expansion region based on the mark of position of the second expansion region; and
      adjusting the mark of the position of the first obstacle based on the mark of the position of the second obstacle.

5. The method according to claim 4, wherein the generating the new electronic map using the current position as the center position and including a mark of the position of the second non-passable area, a mark of the position of the second expansion area, and a mark of the position of the second obstacle, comprises:
   obtaining position information of a position where the stored expansion area is located; and
   generating the new electronic map using the current position as the center position and including the mark of the position of the second non-passable area, the mark of the position indicated by the obtained position information, and the mark of the position of the second obstacle.

6. The method according to claim 1, wherein the pre-generated electronic map is a pre-generated cost map, the new electronic map is a new cost map, the pre-generated cost map and the new cost map have a same size, and the cost map comprises cells marked with cell values; and the adjusting the pre-generated electronic map based on the new electronic map comprises:
adjusting cell values of cells in the pre-generated cost map based on cell values of cells in the new cost map.

7. An apparatus for generating a map, comprising:
a processor and a memory storing computer readable instructions, wherein the instructions, when executed by the processor, cause the processor to perform operations, the operations comprising:
acquiring current position information of a target device and a pre-generated electronic map, wherein a center position of the electronic map is a position indicated by the position information of the target device acquired when the electronic map is generated or before the electronic map is generated;
in response to determining that the current position indicated by the current position information meets a preset adjustment condition, performing the following adjustment step using a new thread to generate an electronic map with complete adjustment: generating a new electronic map using the current position as the center position, and adjusting the pre-generated electronic map based on the new electronic map;
outputting the electronic map with completed adjustment in response to completing the adjustment; and
outputting the pre-generated electronic map or the new electronic map at a preset frequency,
wherein in response to determining that the current position indicated by the current position information meets a preset adjustment condition, using a new thread is to perform the following adjustment step to generate an electronic map with complete adjustment comprises:
in response to determining that a distance between the current position and the center position of the pre-generated electronic map is greater than a preset distance threshold, using a new thread to perform the adjustment step to generate an electronic map with complete adjustment, wherein the distance being set to be proportional to a moving speed of the target device, and
wherein the operations further comprise:
expanding a portion of a first obstacle located outside a first non-passable area, the first obstacle being an obstacle in an area of a predetermined size where the target device is located, and the first non-passable area being a non-passable area in the area of the predetermined size;
obtaining a first expansion area based on expanding the portion of the first obstacle; and
providing, in the pre-generated electronic map, a mark of the position of the first expansion area.

8. The apparatus according to claim 7, wherein the pre-generated electronic map is obtained using the following generation step:
acquiring the position information of the target device;
determining a position of a first obstacle and a first non-passable area within an area of a predetermined size where the position indicated by the position information is located;
expanding a portion of the first obstacle located outside the first non-passable area to obtain a first expansion area; and
generating an electronic map using the position indicated by the position information as the center position and including a mark of the position of the first obstacle, a mark of a position of the first expansion area, and a mark of a position of the first non-passable area.

9. The apparatus according to claim 8, wherein the first obstacle includes a first type obstacle and a second type obstacle, position information of the first type obstacle is obtained from a target electronic device, and position information of the second type obstacle is obtained from the target device; and
the generating step further comprises:
storing position information of a position of an expansion area corresponding to a portion of the first type obstacle outside the first non-passable area.

10. The apparatus according to claim 8, the generating a new electronic map using the current position as the center position, comprising:
determining a position of a second obstacle in the new electronic map to be generated and a position of a second non-passable area;
expanding a portion of the second obstacle outside the second non-passable area to obtain a second expansion area; and
generating the new electronic map using the current position as the center position and including a mark of the position of the second non-passable area, a mark of the position of the second expansion area, and a mark of the position of the second obstacle; and
the adjusting the pre-generated electronic map based on the new electronic map comprises:
adjusting the center position of the pre-generated electronic map to the center position of the new electronic map;
adjusting the mark of the position of the first non-passable area based on the mark of the position of the second non-passable area;
adjusting the mark of the position of the first expansion region based on the mark of position of the second expansion region; and
adjusting the mark of the position of the first obstacle based on the mark of the position of the second obstacle.

11. The apparatus to claim 10, wherein the generating the new electronic map using the current position as the center position and including a mark of the position of the second non-passable area, a mark of the position of the second expansion area, and a mark of the position of the second obstacle, comprises:
obtaining position information of a position where the stored expansion area is located; and
generating the new electronic map using the current position as the center position and including the mark of the position of the second non-passable area, the mark of the position indicated by the obtained position information, and the mark of the position of the second obstacle.

12. The apparatus according to claim 7, wherein the pre-generated electronic map is a pre-generated cost map, the new electronic map is a new cost map, the pre-generated cost map and the new cost map have a same size, and the cost map comprises cells marked with cell values; and
the adjusting the pre-generated electronic map based on the new electronic map comprises:
adjusting cell values of cells in the pre-generated cost map based on cell values of cells in the new cost map.

13. A non-transitory computer readable medium storing a computer program, wherein the program, when executed by a processor, causes the processor to perform operations, the operations comprising:

acquiring current position information of a target device and a pre-generated electronic map, wherein a center position of the electronic map is a position indicated by the position information of the target device acquired when the electronic map is generated or before the electronic map is generated;

in response to determining that the current position indicated by the current position information meets a preset adjustment condition, using a new thread is to perform the following adjustment step to generate an electronic map with complete adjustment: generating a new electronic map using the current position as the center position, and adjusting the pre-generated electronic map based on the new electronic map;

outputting the electronic map with completed adjustment in response to completing the adjustment; and outputting the pre-generated electronic map or the new electronic map at a preset frequency, wherein in response to determining that the current position indicated by the current position information meets a preset adjustment condition, using a new thread is to perform the following adjustment step to generate an electronic map with complete adjustment comprises:

in response to determining that a distance between the current position and the center position of the pre-generated electronic map is greater than a preset distance threshold, using a new thread to perform the adjustment step to generate an electronic map with complete adjustment, wherein the distance being set to be proportional to a moving speed of the target device, and wherein the operations further comprise:

expanding a portion of a first obstacle located outside a first non-passable area, the first obstacle being an obstacle in an area of a predetermined size where the target device is located, and the first non-passable area being a non-passable area in the area of the predetermined size;

obtaining a first expansion area based on expanding the portion of the first obstacle; and providing, in the pre-generated electronic map, a mark of the position of the first expansion area.

* * * * *